United States Patent Office 3,041,088
Patented June 26, 1962

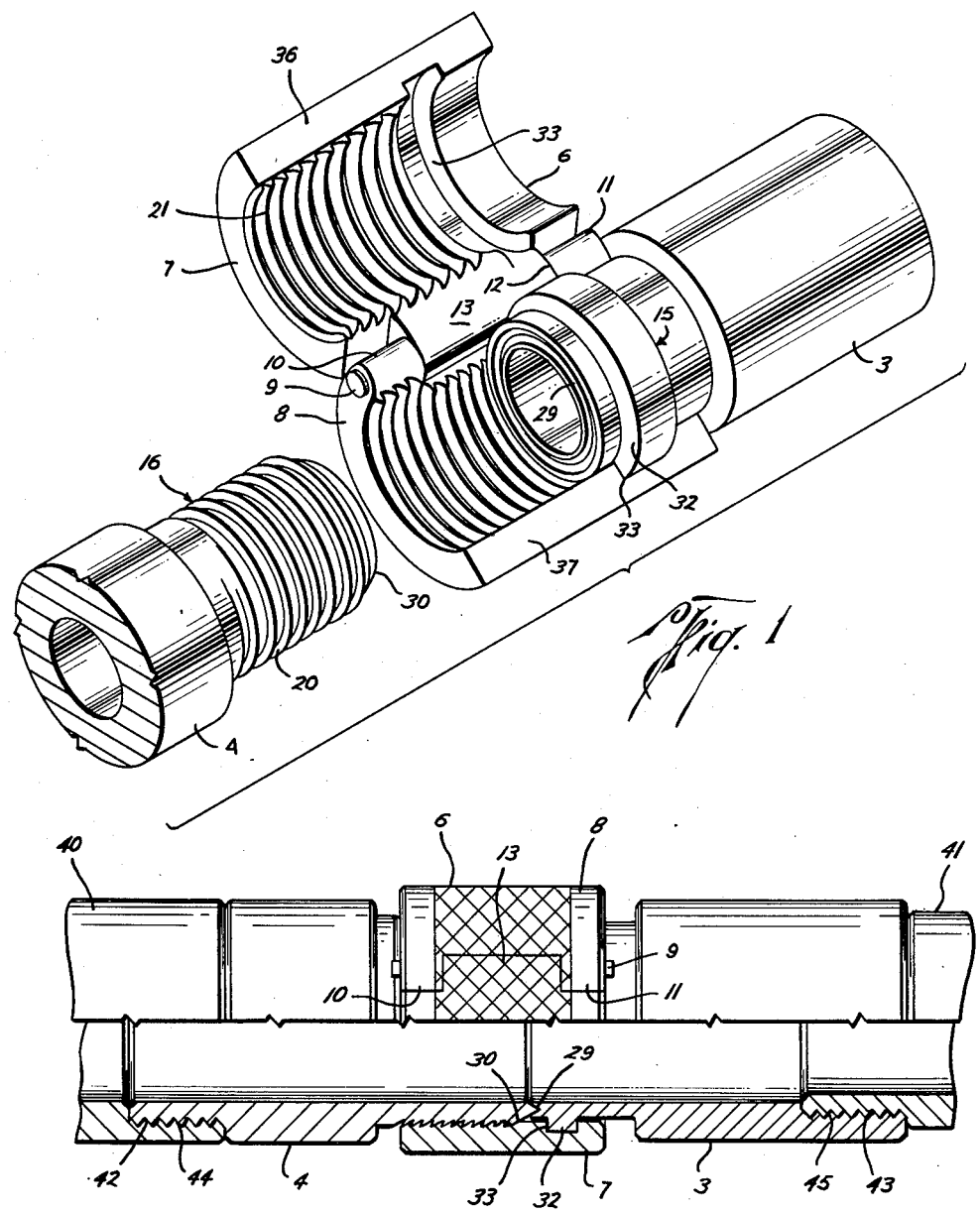

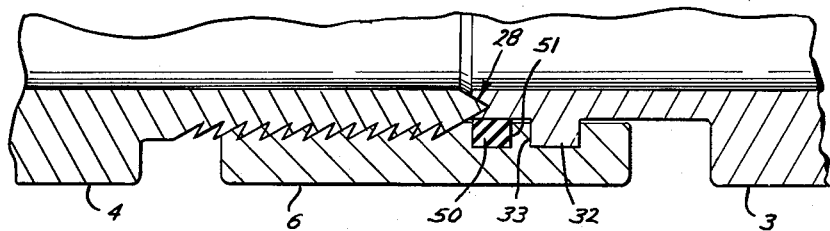
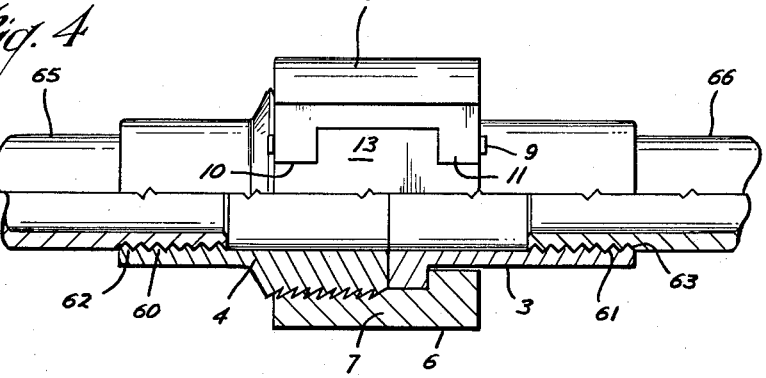
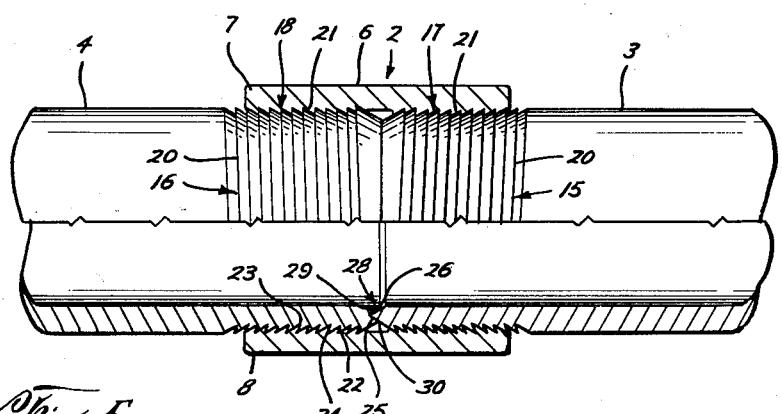

3,041,088
COUPLING ASSEMBLY
Ira M. Brandon, Jr., 1520 Colquitt, Apt. 1,
Houston 6, Tex.
Filed June 18, 1959, Ser. No. 821,306
6 Claims. (Cl. 285—33)

The present invention relates to a coupling assembly for connecting tubular members together.

Various types of couplings have been heretofore adapted and are presently in use in the industry. Most of such coupling arrangements are disadvantageous in that they incorporate on their external surfaces projections or other configurations whereby the couplings may be connected and readily disconnected. Under some circumstances it is extremely difficult to manipulate these couplings with the projections thereon so that they can be engaged, particularly where the tubular members which are to be engaged are already located in a position of limited access.

Other quick coupling arrangements in use at the present time incorporate additional means which are utilized for connecting the coupling about tubular members and retaining it in position thereon.

The present invention incorporates a coupling assembly for connecting tubular members together which has no external projections or configurations on the external surface thereof, and which coupling arrangement does not utilize any outside means for holding the coupling in position on the tubular members after it has been positioned thereon.

An object of the present invention is to provide a coupling assembly for connecting tubular members together, which coupling arrangement may be easily and quickly connected in position on the tubular members.

Still another object of the present invention is to provide a coupling assembly for connecting tubular members together in fluid tight relationship.

Still another object of the present invention is to provide a coupling arrangement for connecting tubular members together, which coupling arrangement entails a minimum of expense in manufacture, and may be quickly and easily positioned for connecting tubular members together.

Still a further object of the present invention is to provide a coupling arrangement for connecting tubular members together, which tubular members have provided thereon ordinary pipe threads as presently used in the industry.

Still another object of the present invention is to provide a coupling assembly for connecting tubular members together, wherein the tubular members are provided with undercut thread portions on their adjacent end portions, and a split coupling which is hingedly connected together and has undercut threads on its inner periphery which are adapted to mate with the undercut threads on the end portions of the tubular members so that the tubular members and the couplings may be made up by relative rotation therebetween.

Still another object of the present invention is to provide a quick coupling arrangement for tubular members which locks the members in a desired relationship, and which incorporates a sealing arrangement to inhibit leakage from the inside to the outside of the tubular members.

Yet a further object of the present invention is to provide a quick coupling arrangement which includes a unique configuration on the ends of adjacent tubular members whereby the tubular members may be sealed to inhibit fluid leakage when the coupling arrangement connects the tubular members together.

Other objects and advantages of the present invention will become more readily apparent from consideration of the following description and drawings wherein;

FIG. 1 is an exploded isometric view illustrating a modification of the present invention;

FIG. 2 is a quarter sectional view illustrating the coupling assembly or arrangement of the present invention after it has been made up and with the tubular members in fluid tight relation;

FIG. 3 is a partial, enlarged sectional view illustrating an additional form of seal arrangement of the coupling assembly shown in FIG. 2;

FIG. 4 is a quarter sectional view illustrating still another form of the present invention; and FIG. 5 is a quarter sectional view, illustrating the tubular members when they are mated or in assembled relationship, and the coupling in one half sectional view which connects the tubular members together.

Attention is first directed to FIG. 5 of the drawings wherein the invention is illustrated generally by the numeral 2. The invention includes the paired tubular members 3 and 4 which are positioned relative to each other so that they may be secured in end to end relation as illustrated in FIG. 5 of the drawings. The coupling 6 is positioned about the paired tubular members 3 and 4 connected in end to end relation, the coupling 6 being formed of two portions 7 and 8 as illustrated in FIG. 1 of the drawings. It will be noted that the portions 7 and 8 are hingedly connected together by any suitable means such as the pin 9 which extends through the ears 10 and 11 of one portion which ears are provided with a groove or recess 12 therebetween for receiving the projection 13 on the portion 7 of the coupling, and the pin 9 extends through the ears 10 and 11 and the projection 13 aligned therewith as shown in FIG. 1 of the drawings whereby the portions 7 and 8 of the coupling 6 may be engaged about the tubular members 3 and 4 for connecting them together.

The members 3 and 4 are provided with suitable means whereby the coupling can be readily locked in engagement therewith, such means being designated generally by the numerals 15 and 16 on the tubular members 3 and 4 respectively. The coupling 6 is also provided with means designated generally at 17 and 18 for cooperating with the means 15 and 16 on each of the members 3 and 4 whereby the coupling 6, and the tubular members 3 and 4 may be engaged together.

In the modification of the invention illustrated in FIG. 5 of the drawings, the means 15 and 16 adjacent the end portions of the tubular members 3 and 4 is shown as being in the form of undercut threads 20. Similarly, the means 17 and 18 on the coupling 6 comprise undercut threads 21 which are adapted to mate with the undercut threads 20 on the ends of each of the tubular members 3 and 4.

The undercut threads 20 and 21 on the members 3, 4 and the coupling 6 respectively may be of any suitable configuration as desired, without departing from the scope of the invention. The object of the undercut threads is to provide a face 22 thereon such as illustrated in FIG. 5 of the drawings on the undercut threads 20 of the member 4, which face terminates at the inner end that is recessed relative to the apex 24 of the threads. Similarly, the threads 21 are undercut so that the inner end, or termination of each thread is inclined inwardly and rearwardly relative to the apex of that respective thread. Thus, the members 3 and 4 and the coupling 6 may be connected together by positioning one of the coupling portions 7 or 8 so that its undercut threads 21 on each end thereof are in engagement with the undercut threads 20 on each end of the members 3 and 4, and with the ends 25 and 26 of the tubular members 3 and 4 spaced apart a fraction of an inch. Thereafter the other portion of the coupling may be swung into position so that its undercut threads 21 also engage with the mating undercut threads 20 on the members 3 and 4 and thereafter relative rotation between the coupling 6 which encircles the tubular members 3 and 4, and the tubular members 3 and 4, causes the tubular members 3 and 4 to make up, or to abut each other as illustrated in FIG. 5 of the drawings.

In order to prevent fluid leakage from inside to outside of the tubular members after they have been made up, suitable seal means as illustrated at 28 may be provided. In the form of the seal means illustrated in FIG. 5 of the drawings, such seal means comprises a groove 29 formed on the end 26 of the tubular member 24, and a conforming projection 30 on the end of the member 30 so that when the members 3 and 4 are abutted, the conforming projection 30 will fit snugly within the groove 29 and thereby form a seal from inside to outside of the tubular members. It will be noted that the coupling 6 has no external projections on its outer surface to aid in positioning it on the members 3 and 4, nor is is necessary to provide any additional means for locking the coupling 6 on the tubular members 3 and 4, other than the undercut threads 21 as previously described herein.

In breaking the joint, it is only necessary to effect a slight relative rotation between the tubular members 3 and 4 and the coupling 6 in a rotational direction opposite to that for tightening them, and the members 3 and 4 will thereupon separate which permits the coupling 6 to be removed from the tubular members 3 and 4 by swinging the coupling portions 7 and 8 relative to each other.

The construction and arrangement of the shouldered means 15, 16 and 17 on the tubular members 3, 4 and 6 respectively, not only locks the tubular members 3 and 4 together when they are made up as described herein, but such shoulder means also locks the half portions 7 and 8 together about the tubular members 3 and 4 to inhibit premature release thereof. However, the coupling 6 may be quickly and easily removed from its position on the tubular members 3 and 4 after the tubular members have been separated longitudinally slightly by relative rotation to break the joint as noted hereinbefore.

The present invention has particular utility in connection with a tubular member where it is necessary to repeatedly couple and uncouple a plurality of tubular members together, such as in irrigation conduits where it is necessary to irrigate at only certain periods during the day, and where it may be desirable or necessary to uncouple and stack or store the pipe between the irrigation intervals. Of course, the present invention has application in any situation where it may be desired to connect members together and the reference to its use in connection with irrigation pipe is merely for purposes of illustration and explanation of the invention.

It will be noted that in the FIG. 5 modification of the invention, the undercut threads 20 are formed on the tubular members 3 and 4. Under some circumstances it may be desirable to provide a coupling assembly wherein it may be connected to members which are provided with ordinary pipe threads, or other similar threaded arrangements. In this connection reference is made to FIG. 1 of the drawings wherein the tubular members are again illustrated by the reference numerals 3 and 4. It will be noted that the shouldered means 15 on the one tubular member 3 is in the form of an annular flange 32. The shouldered means 16 on the other tubular member 4 is in the form of undercut threads as previously described herein. Also, the coupling 6 must be modified so that its shouldered means will conform with the shouldered means on the tubular members 3 and 4 respectively. Therefore, in this situation the coupling 6 is provided with an annular groove 33 in each of its portions 7 and 8, which groove is adapted to fit the annular flange 32 when the coupling portions 7 and 8 are positioned about the members 3 and 4 as represented in FIG. 1 of the drawings. It will be noted that the coupling 6 is provided with undercut threads 21 on one portion thereof which engage the undercut threads 20 on the end of the tubular member 4. Similarly, seal means as previously described in connection with FIG. 5 may be provided in the form of the groove 29 and the projection 30 so that when the members 3 and 4 are abutted, and the coupling 6 locked thereon as previously described herein, a fluid tight arrangement will be provided. In FIG. 2 of the drawings, the coupling 6 is illustrated as being in its seated position around the tubular members 3 and 4. It will be noted that the coupling portions 7 and 8 have been swung to their closed position with their ends 36 and 37 in close proximity. Therefore, when relative rotation is effected between the tubular members 3 and 4 and the coupling 6 with the portions 7 and 8 closed about the members 3 and 4, the members 3 and 4 will be moved to a made up position, or will be moved to an abutting relationship as shown in FIG. 2 of the drawings. As previously described, when this occurs, the undercut thread arrangement 21 on the coupling 6 and the undercut thread arrangement on one of the members 3 or 4 will serve to lock the coupling portions 7 and 8 in enclosed or encircled position about the tubular members 3 and 4. It will be noted that the flange 32 on the member 3 is seated within the groove 33 in the coupling 6, and that the projection 30 on the end of the member 4 is seated within the groove 29 on the member 3 in a manner as previously described.

In the modification of the invention presently described, the tubular members 3 and 4 function as adaptors so that the adjacent tubular members 40 and 41 may be connected together. In some circumstances it will be desired to use the present invention on tubular members which may be provided with any of various ordinary threads presently employed on the ends of tubular members. In this situation, the members 3 and 4 will have their end portions threaded as illustrated at 42 and 43 respectively for engaging with the threads, such as the type threads 44 and 45 respectively on the members 4 and 3. Thus, the present invention may be employed without the necessity of providing special threads on the ends of tubular members, or without the necessity of rethreading tubular members which are presently provided with other types of thread.

In some circumstances it may be desired to provide an alternate form of seal means, which is illustrated in FIG. 3 of the drawings as compising the resilient seal element 50 which is seated within the groove 51 on the coupling 6. The resilient seal ring 50 serves to provide additional seal between the tubular members 3 and 4 and the coupling 6.

In FIG. 4 the tubular members 3 and 4 assume the form of adaptors as mentioned with regard to the FIG. 2 modification. It will be noted that in the FIG. 4 modification, each of the tubular members 3 and 4 are internally threaded as illustrated at 60 and 61 for engaging the external threads 62 and 63 on the tubular members 65 and 66 respectively. The function and operation of the invention as illustrated in FIG. 4 is substantially similar to that previously described with regard to FIGS. 1 and 2, in that the coupling 6 and the tubular members 3 and 4 are connected together in a manner as previously described.

From the foregoing description it can be appreciated that the coupling assembly of the present invention provides an arrangement whereby a coupling may be quickly and easily positioned on adjacent tubular members for connecting the tubular members together, and for retaining the tubular members in connected arrangement until it is desired to release them relative to each other. The coupling arrangement of the present invention provides a construction which can be fitted about tubular members when the tubular members are in situ in positions of limited access. The coupling 6 has no external projections or configurations on its external surface which would make it difficult to position either the portion 7 or 8 about the adjacent tubular members 3 and 4 to be connected together, and the coupling 6 may be easily closed about the members 3 and 4 merely by swinging the free portion of the coupling to seating position on the members 3 and 4.

Thereafter, as the tubular members are made up on the coupling 6 by relative rotation between the tubular members 3 and 4 and the coupling 6, the tubular members 3 and 4 will move into abutting position and by reason of the shouldered means 16, 16 and 18 on the members 3, 4 and 6 respectively, such members will be retained in engaged relationship until the tubular members 3 and 4 are again rotated in a reverse or opposite direction so to move their ends away from engagement with each other.

The coupling 6 can also function as a blanking flange. For example, a disc with seals about the edge thereof could be positioned in groove 33, to close off flow through coupling 6 and the coupling 6 engaged on the member 4. This would blank off, or close off member 4 and of course member 3 would not be used in this embodiment of the invention.

Broadly the present invention relates to a coupling assembly, and more particularly to a coupling assembly which can be easily and quickly positioned on tubular members for connecting them together, and which coupling assembly incorporates means for retaining the coupling assembly in position.

What is claimed is:

1. A coupling assembly for connecting tubular members comprising, paired tubular members in end to end relation and having ends adapted to contact in abutting engagement, shoulder means on each of said tubular members adjacent their ends, coupling means for connecting said paired tubular members, said coupling comprising two portions, means hingedly connecting said portions whereby said coupling may be opened and engaged about said tubular members, first shoulder means on said coupling for engaging said shoulder means on one of said tubular members, second shoulder means on said coupling for engaging said shoulder means on the other of said tubular members, and said first shoulder means on said coupling and the shoulder means on said one of said tubular members including undercut threads formed at an acute angle of less than ninety degrees and not more than an angle which would prevent interengagement of said threads when said coupling is engaged about said tubular members whereby relative rotation between said coupling and said one of said tubular members moves said ends into abutting contact and effects a locking of said coupling on said tubular members.

2. The structure recited in claim 1, including seal means between said coupling and at least one of said tubular members for sealing between the inside and outside of said tubular members.

3. The structure set forth in claim 1, wherein said second shoulder means on said coupling and on the said other tubular member include an annular projection on said other tubular member and an annular groove in said two portions of said coupling, said groove being adapted to receive said projection when said coupling is engaged upon said tubular members.

4. The structure set forth in claim 1, wherein said abutting ends are formed with a mating annular groove and projection for assuring a seal between said ends when they are in abutting contact.

5. A coupling assembly for connecting tubular members comprising, paired tubular members in end to end relation and having ends adapted to contact in abutting engagement, shoulder means on each of said tubular members adjacent their ends, coupling means for connecting said paired tubular members, said coupling comprising two portions, means hingedly connecting said portions whereby said coupling may be opened and engaged about said tubular members, shoulder means on said coupling for engaging said shoulder means on said tubular members, said shoulder means on one of said tubular members including left-hand undercut threads and said shoulder means on the other of said tubular members including right-hand undercut threads, said shoulder means on said coupling including a first section of left-hand undercut threads adapted to engage with said left-hand undercut threads on said one of said tubular members, said shoulder means on said coupling including a second section of right-hand undercut threads adapted to engage with said right-hand undercut threads on said other of said tubular members, and said undercut threads on said coupling and on said tubular members being formed at an angle of less than ninety degrees and not more than an angle which would prevent interengagement of the threads on said coupling with the threads on said tubular members, whereby relative rotation between said coupling and said tubular members moves said ends into abutting contact and effects a locking of said coupling on said tubular members.

6. The structure set forth in claim 5, wherein said abutting ends are formed with a mating annular groove and projection for assuring a seal between said ends when they are in abutting contact.

References Cited in the file of this patent

UNITED STATES PATENTS

| | | |
|---|---|---|
| 435,800 | Connor | Sept. 2, 1890 |
| 781,571 | Thomas | Jan. 31, 1905 |
| 2,215,770 | Sheffield | Sept. 24, 1940 |
| 2,284,216 | Kunkel | May 26, 1942 |
| 2,649,314 | Richardson | Aug. 18, 1953 |

FOREIGN PATENTS

| | | |
|---|---|---|
| 82,339 | Austria | Aug. 15, 1916 |